Nov. 14, 1944.  W. B. DAMSEL  2,362,454
PIPE COUPLING
Filed July 16, 1941   2 Sheets-Sheet 1
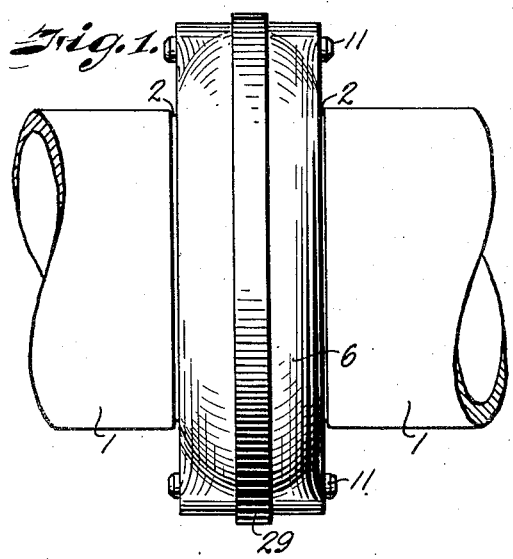
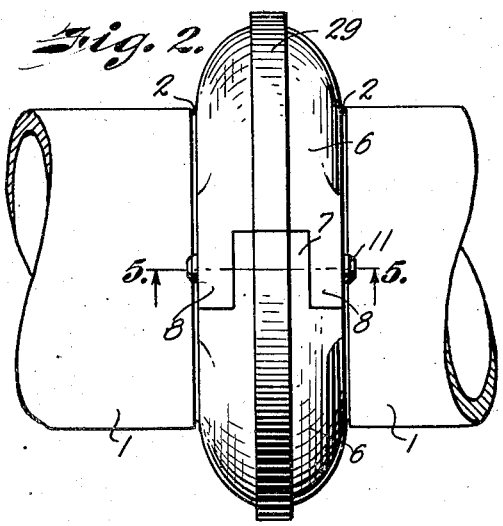
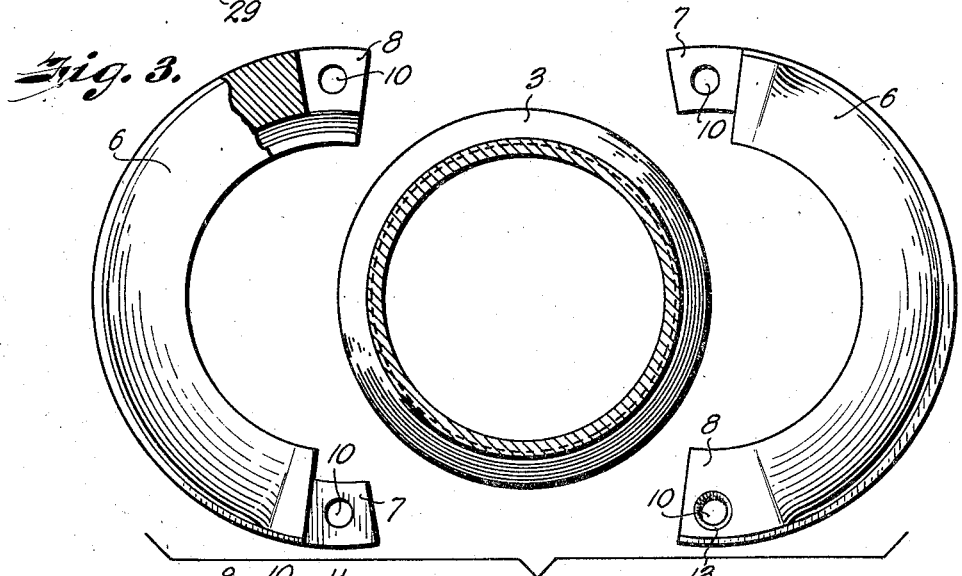
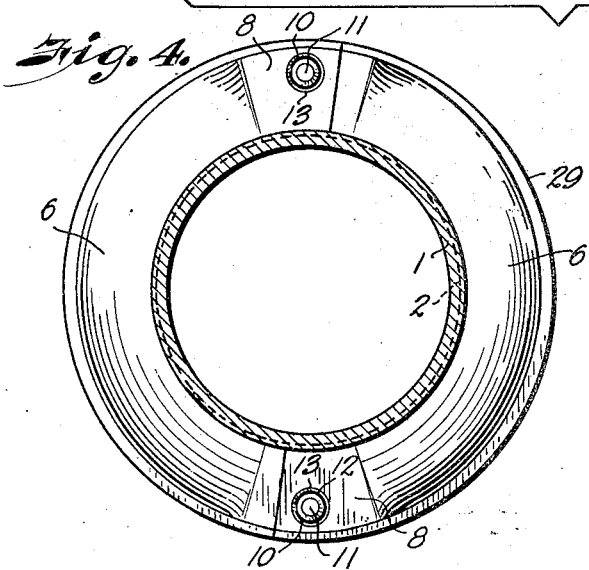
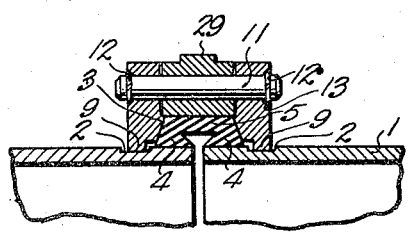
INVENTOR.
William B. Damsel
BY Thos. E. Scofield
ATTORNEY.

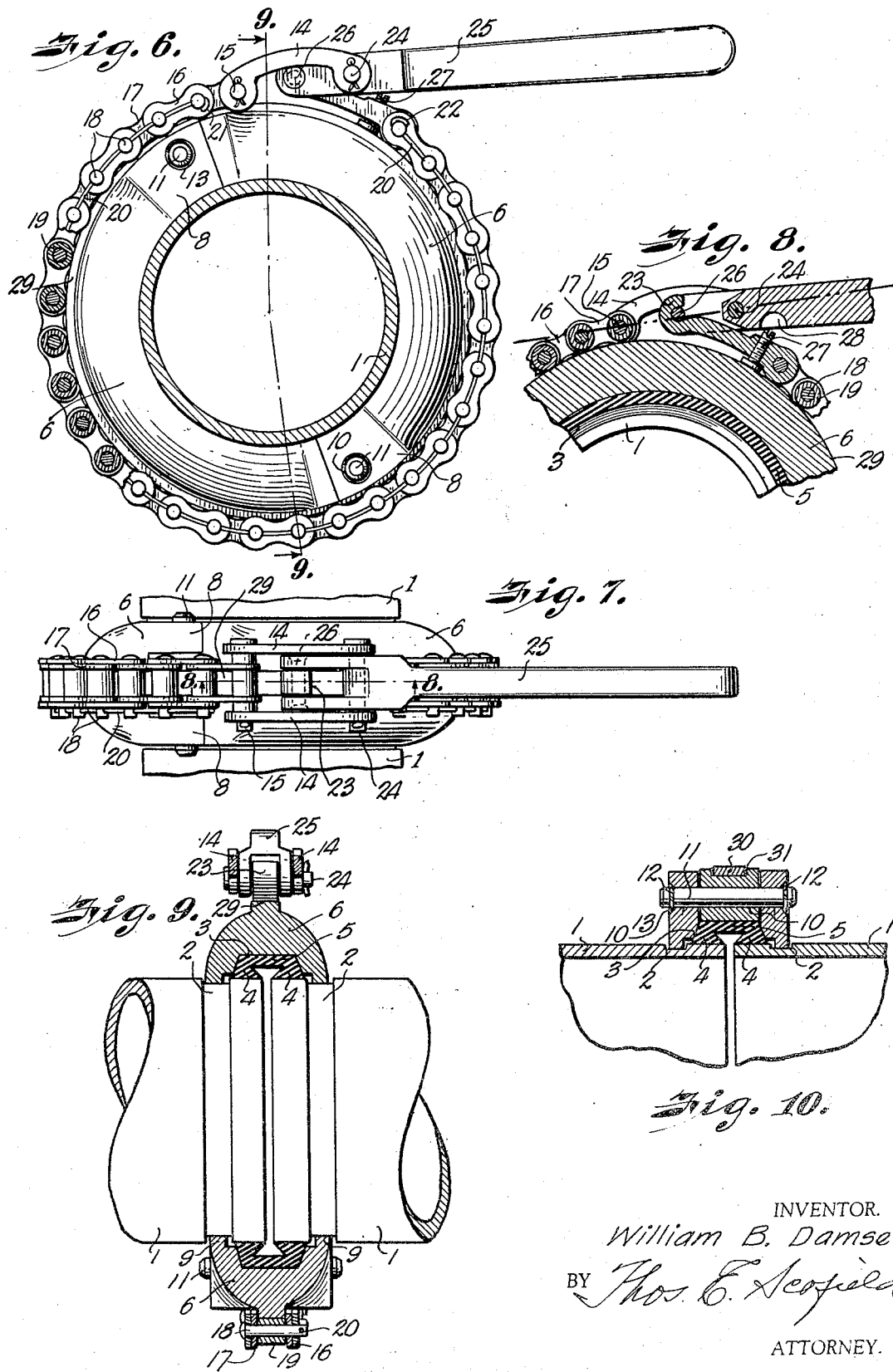

Patented Nov. 14, 1944

2,362,454

UNITED STATES PATENT OFFICE 2,362,454

PIPE COUPLING

William B. Damsel, Scarsdale, N. Y.; Nelle Hood Damsel executrix of said William B. Damsel, deceased Application July 16, 1941, Serial No. 402,578

1 Claim. (Cl. 285—129)

This invention relates to improvements in pipe couplings and more particularly to a pipe coupling utilizing a flexible gasket, the coupling being made up of a plurality of segmental housing sections affixed to the pipe ends to be joined by compressing the housing sections which surround the gaskets to form the joint and locking the sections with a removable locking means insertable and removable with the use of a compression tool which serves to draw the sections by pressure imposed circumferentially of the housing sections.

Pipe couplings used to insure a fluid-tight connection present numerous difficulties. Where flexible gaskets are used, with surrounding housing sections, the conventional method for assembling the housing sections is to use bolts which are inserted through apertures in ears or lugs formed on the semicircular housing sections. The joint is then made tight by drawing the two halves of the housing together by tightening with a wrench, nuts on the connecting bolts. Such construction does not always give a satisfactory joint as excessive strain is usually imposed upon the bolts without improving the tightness of the joint. The construction lends itself more readily to corrosion due to differences in the character of the metal used in the housing and connecting bolts. A relatively large space is required to permit the worker to manipulate a wrench in tightening the connecting bolts and a relatively large space is required for the joint over the pipe size, due to the protruding ears and bolt ends.

In a previous patent issued to me, No. 2,014,313, dated September 10, 1935, and in subsequent applications for patent, Serial No. 366,420, filed November 20, 1940, and Serial 395,917, filed May 31, 1941, I have proposed an improved type of pipe coupling which avoids the use of bolted housings. The present invention is an improvement over the constructions shown in preceding applications, particularly with reference to the ease of assembly, the present construction eliminating the use of a retaining ring surrounding the housing sections. The pipe coupling hereinafter described offers the following advantages:

1. The compression on the resilient gasket is more uniformly applied and maintained.
2. The size of the coupling is reduced by the elimination of projecting ears and bolts.
3. The construction permits assembly of the coupling within a more restricted space than required when bolts must be tightened to draw the housing sections together.
4. Fragile elements of the coupling, such as bolts, bolt threads, ears or projections from the housing are eliminated, reducing also the likelihood of corrosion.
5. The ease of assembly and disassembly is greatly facilitated.

In the accompanying drawings which form part of the instant specification and are to be read in conjunction therewith and in which like reference numerals are used to indicate like parts in the various views;

Fig. 1 is an edge view of the coupling with the interlocking joints coinciding with the vertical diameter of the coupling.

Fig. 2 is a similar edge view showing the joint rotated to a position ninety degrees from that shown in Fig. 1.

Fig. 3 is a disassembled view of the coupling, showing two separate housing sections and a resilient gasket therebetween.

Fig. 4 is a face view of the assembled coupling.

Fig. 5 is a view taken along the line 5—5 in Fig. 2.

Fig. 6 is a face view of the assembled coupling with the compression tool or toggle in position.

Fig. 7 is a top edge view of the showing in Fig. 6.

Fig. 8 is a view taken along the line 8—8 in Fig. 7.

Fig. 9 is a sectional view taken along the line 9—9 in Fig. 6.

Fig. 10 is a sectional view similar to that shown in Fig. 5, modified with respect to the type of flexible element used on the toggle or compression tool and the ridge spanning the perimeter of the coupling replaced by a groove.

Referring now to the drawings, the pipe ends 1 are grooved as shown at 2, adjacent their extremities to permit engagement of keying members on the housing, hereinafter explained. Fitted over the ends of the aligned pipes to be joined is a resilient gasket 3 formed with two annular lips 4, connected by an annular bridging portion 5. The resilient gasket is of conventional design. The metal housings surrounding the gasket consist of two segmental sections 6 identical in construction with interlocking joints at their extremities comprising tongues 7 and bifurcated members 8 between which the tongues fit to form a tongue and groove joint as shown in Fig. 2. The housing sections 6 are internally shaped to accommodate the resilient gasket after the latter has been placed over the pipe ends as shown in Fig. 9. The annular rims 9, formed in the outside edges internally of the housing sections, key into the grooves 2, formed adjacent the pipe ends and limit lateral movement of the coupling, as shown in Fig. 9.

In the tongues 7, and bifurcated portions 8 of the housing are holes 10 into which are inserted locking pins 11 when the housing sections have been assembled around the flexible gasket. Near the ends of the locking pins are grooves into which are fitted split rings 12 which prevent the pins from being easily dislodged after they have been inserted. The edges of the holes 10 on the outside surfaces of the bifurcated members 8 are beveled as shown at 13 in Fig. 3 to facilitate insertion and removal of the locking pins with their split retaining rings.

To aid in the assembly and removal of the coupling from a pipe joint, there is used a compression tool or toggle arrangement, shown in Figs. 6 and 7. This tool consists of a standing part or link 14 at one end of which is pivoted at a pin 15 a flexible cotter type roller chain or link belting made up of links 16 and 17 through which extend pins 18. On the pins 18 are mounted cylindrical rollers 19. The ends of the pins which extend from one side of the links are drilled to receive the cotter wire 20, which is preferably a steel piano wire of 16 to 14 gauge and of such length that it holds the roller chain in an arcuate shape. To prevent removal of the cotter wire, the ends are bent back over the pins at the extremities of the chain, in a reverse direction. In other words, if one end of the wire is bent inwardly as shown at 21, the opposite end is bent outwardly as shown at 22 in Fig. 6. The bending of the ends of the guide wire or cotter wire prevents axial rotation of the wire in the pin ends, retaining the arcuate shape of the flexible chain and preventing improper application of the compression tool or toggle to the coupling when assembling or removing the housing sections from the pipes to be joined.

To the free end of the roller chain is attached a hook 23. To the standing part or link 14 opposite the end to which the roller chain is attached is pivoted at 24 a lever 25. The end of the lever is bifurcated and joining the two parts of one end is a pin 26 engaged by the hook 23 when the compression tool is in position around the housing sections. Note that the lever 25 is pivoted at 24 to the end of the standing part 14 a short distance from the end of the lever, permitting the use of the lever as a fulcrum to shorten or lengthen the roller chain by movement of the lever.

In assembling the coupling the resilient gasket is placed on one end of a grooved pipe and, as the other pipe is aligned therewith, the opposite lip of the gasket is attached to the abutting pipe end. The housing sections are then fitted around the gasket and the free end of the compression tool placed about the two halves of the housing sections. The lever 25 is pivoted at 24 to a position where the pin 26 at the end of the lever is engaged by the hook 23 on the free end of the roller chain. Utilizing the lever as a fulcrum on its pivot 24, the circle circumscribed by the chain enclosing the casing sections, is decreased until the hole 10 on the tongues 7 and bifurcated members 8 on the housing sections register, at which time proper pressure to insure a fluid-tight joint is imposed upon the resilient gasket. When the sections have been drawn to a position of registration with the holes 10, locking pins 11 are inserted in both joints of the housing sections and the compression tool removed. A flat headed adjustment screw 27 is provided in the shank of the hook 23. This adjustment screw abuts against the outer surface of the housing and provides a limited amount of adjustment of the circumferential distance spanned by the roller chain. A depression 28 in the lever accommodates the top of the adjustment screw.

Around the perimeter of the housing sections is a flat ridge or track 29 upon which the rollers 19 of the chain ride, the sides of the ridge being engaged by ears of the links 16, preventing displacement of the chain from the housing sections while the compression tool or toggle is being used.

While the flexible end of the compression tool is shown in its preferred form as a cotter type roller chain or link belting, a flexible band or strip of metal 30 may be used in place of the chain, as shown in Fig. 10. In this event, in place of the ridge or track 29, a groove 31 is formed in the housing sections. This modification is shown in Fig. 10. The utilization of a band or strip in place of a roller chain introduces somewhat more friction into the work of assembling the housing sections than does the roller chain toggle and does not incorporate the edges of the guide wire 20 used with the roller chain.

To renew or replace the gasket, or when the housing sections are to be disassembled for any reason, it is simply a matter of applying the compression tool to the coupling and applying a sufficient compression to remove the shearing strain from the locking pins, when they can be readily removed from the casing. The toggle or compression tool is then removed and the sections easily disassembled.

It will be understood that certain features and sub-combinations are of utility and may be employed without reference to other features and sub-combinations. This is contemplated by and is within the scope of my claim. It is further obvious that various changes may be made in details within the scope of my claim without departing from the spirit of my invention. It is, therefore, to be understood that my invention is not to be limited to the specific details shown and described.

Having thus described my invention, I claim:

A pipe coupling for joining pipe ends of the type wherein the coupling is applied by means of a compression tool, a resilient annular gasket engaging the abutting ends of the pipes to be joined; a housing made up of segmental sections surrounding the gasket, said sections adapted to be drawn together to an extent within the limits of the resiliency of said gasket; tongues and grooves at the extremities of the housing sections for joining said sections together, said tongues and the walls defining said grooves having apertures therein registering only when compressive force is applied to the housing sections to compress the gasket so that the sections are drawn to their final position on the pipes in forming the pipe joint; locking pins insertable in said apertures only when said apertures are in a registering position; and means on the periphery of the housing sections engageable by the compression tool in applying compressive force to said sections, the arrangement being such that the resilient action of the compressed gasket normally tending to move the housing sections apart binds the locking pins in the apertures, whereby to prevent said pins from becoming loose and releasing said sections.

WILLIAM B. DAMSEL.